(12) United States Patent
Kim

(10) Patent No.: US 7,583,683 B2
(45) Date of Patent: Sep. 1, 2009

(54) ROUTER USING CLOCK SYNCHRONIZER FOR DISTRIBUTED TRAFFIC CONTROL

(75) Inventor: Kicheon Kim, Seoul (KR)

(73) Assignee: Yang Soon Cha, Seoul (KR)

( * ) Notice: Subject to any disclaimer, the term of this patent is extended or adjusted under 35 U.S.C. 154(b) by 207 days.

(21) Appl. No.: 11/125,025

(22) Filed: May 9, 2005

(65) Prior Publication Data

US 2005/0254480 A1 Nov. 17, 2005

(30) Foreign Application Priority Data

May 17, 2004 (KR) ...................... 10-2004-0034979

(51) Int. Cl.
*H04L 12/28* (2006.01)
(52) U.S. Cl. .................. 370/401; 370/503; 370/509; 370/412; 370/413; 455/502
(58) Field of Classification Search ............... 455/428, 455/455, 560, 502; 370/238, 351–356, 389, 370/396, 395, 42, 411–419, 428–429, 503, 370/235, 401, 509, 350; 709/202–205; 714/39; 710/1, 58, 61
See application file for complete search history.

(56) References Cited

U.S. PATENT DOCUMENTS

| | | | |
|---|---|---|---|
| 4,340,857 A * | 7/1982 | Fasang | 714/733 |
| 5,790,608 A | 8/1998 | Benayoun et al. | |
| 6,195,359 B1 * | 2/2001 | Eng et al. | 370/401 |
| 6,434,562 B1 * | 8/2002 | Pennywitt et al. | 707/10 |
| 6,798,743 B1 * | 9/2004 | Ma et al. | 370/235 |
| 6,954,463 B1 * | 10/2005 | Ma et al. | 370/401 |
| 2003/0058880 A1 * | 3/2003 | Sarkinen et al. | 370/413 |
| 2003/0107991 A1 * | 6/2003 | Tezuka et al. | 370/229 |
| 2003/0118048 A1 * | 6/2003 | Dally et al. | 370/466 |
| 2003/0227907 A1 * | 12/2003 | Choi et al. | 370/352 |
| 2004/0073778 A1 * | 4/2004 | Adiletta et al. | 712/220 |
| 2004/0085901 A1 * | 5/2004 | Hooper et al. | 370/235 |
| 2004/0258099 A1 | 12/2004 | Scott et al. | |
| 2005/0053057 A1 * | 3/2005 | Deneroff et al. | 370/360 |

FOREIGN PATENT DOCUMENTS

| KR | 10 2001 001 0918 | 2/2001 |
|---|---|---|
| KR | 10 2002 002 6964 | 4/2002 |
| KR | 10 2003 005 5375 | 7/2003 |

* cited by examiner

*Primary Examiner*—Kamran Afshar
(74) *Attorney, Agent, or Firm*—Jae Y. Park; Kile Goekjian Reed & McManus

(57) ABSTRACT

A router using distributed processing for FIB look-up and fair queuing algorithm is invented. The real-time traffic includes voice and video and should be transmitted in a certain time limit. Otherwise, the quality of the traffic is affected and the information is no longer useful. Packet scheduler in the router transmits packets within the time limit. However, the packet scheduler is not fast enough compared to the link speed and the size of the router. This invention uses a plurality of processors and almost identical time for each processor. FIB look-up and switching are performed by different processors to reduce the processing time. The traffic control algorithm can be performed independently by each processor. Thus, the processing speed of the entire router can be raised.

4 Claims, 3 Drawing Sheets

ROUTER USING CLOCK SYNCHRONIZER FOR DISTRIBUTED TRAFFIC CONTROL

BACKGROUND OF THE INVENTION

1. Field of the Invention

The present invention relates to a router using distributed processing, and more particularly to a router using distributed processing of FIB (Forwarding Information Base) look-up and/or real-time traffic control algorithms in the packet switching network such as the Internet.

2. Description of the Prior Art

As generally known in the art, the main motivation is to provide telecommunication services to the internet users. For this, the FIB look-up is performed by the processor or processing elements on the line interface modules to make the processing faster. A fair queuing algorithm is used to avoid congestion in the routers. Fair queuing is a packet scheduling algorithm based on the calculation of virtual finish time of each packet and sorting the packets in the increasing order of the virtual finish time. The packets are transmitted in that order. By doing this, the packets are transmitted within the virtual finish time. For the calculation of the virtual finish time, the information of the packet arrival time (Ai), the reserved rate (R), the packet length (Li), and the virtual finish time of the previous packet of the connection (Fi−1) is required. The virtual finish time of the first packet of each connection is obtained by adding the first packet arrival time to the packet length divided by the reserved rate; $F1=A1+L1/R$. Afterwards, the virtual finish time is obtained by adding the larger between the packet arrival time and the virtual finish time of the previous packet to the packet length divided by the reserved rate; $Fi=\max(Ai, Fi-1)+Li/R$.

Real-time traffic QoS guarantee in the packet switching network is achieved on a small scale at the experimental level, but large scale implementation for commercial services by the internet service provider is still in difficulties. Increasing speed of links and increasing number of ports cause problems in that demands on computing resources such as processor and memory for implementing fair queuing scheduler get larger. There are opinions that implementation of fair queuing schedulers is not practical for very large router.

There are two approaches to solve these problems. Firstly, it has been pursued to lower the computing complexity of the scheduler. Simplification of the scheduling algorithm decreases the demand on processing power. Secondly, it is increasing the processing speed of the hardware. Dedicated hardware can be devised to speed up the algorithm. These two methods have limitation and we are in doubt about the economy of the solutions.

SUMMARY OF THE INVENTION

Accordingly, the present invention has been made to solve the above-mentioned problems occurring in the prior art, and an object of the present invention is to provide a router architecture performing fair queuing which is used for real-time traffic control in packet switching network. The router architecture of this invention is devised for distributed processing of FIB look-up and the fair queuing algorithm by many processors. Each port can use different processing element. Processing element means control logic which is usually simpler than a general purpose processor. It can be implemented in a VLSI chip. The distributed processing architecture raises the speed of the fair queuing algorithm in the large scale router economically. For the distributed processing of the algorithm, the time of each processing element should be synchronized identically. The time synchronization is achieved by the clock synchronizer providing the reference clock to the entire router system. The main object of this invention is the method of calculation of virtual finish time of each packet by use of separate processing element and the common reference clock in the routing system. The packet scheduler using this invention can guarantee QoS of the real-time traffic on a large scale.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
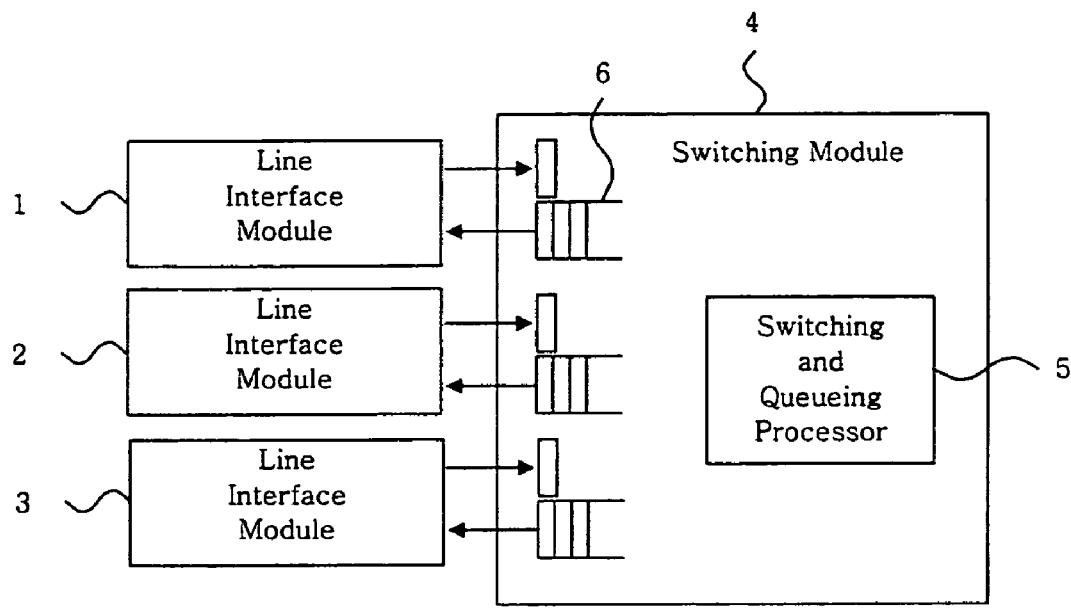
FIG. 1 is a block diagram of a router according to one embodiment of this invention.

Hereinafter, a preferred embodiment of the present invention will be described with reference to the accompanying drawings. In the following description and drawings, the same reference numerals are used to designate the same or similar components, and so repetition of the description on the same or similar components will be omitted.

Referring to FIG. 1, a router according to one embodiment of this invention comprises a plurality of line interface modules 1, 2, and 3 connected to a switching module 4. The usual number of line interface modules which can be installed to the router is 16 and a large scale router system can have more than 32 line interface modules. Each line interface module is connected to a communication link. Packets arriving through the communication link are sent to the switching module 4. The switching and queuing processor 5 in the switching module 4 forwards the packets to the destination line interface module so that the packets are transmitted to the outgoing link.

Figure 2:
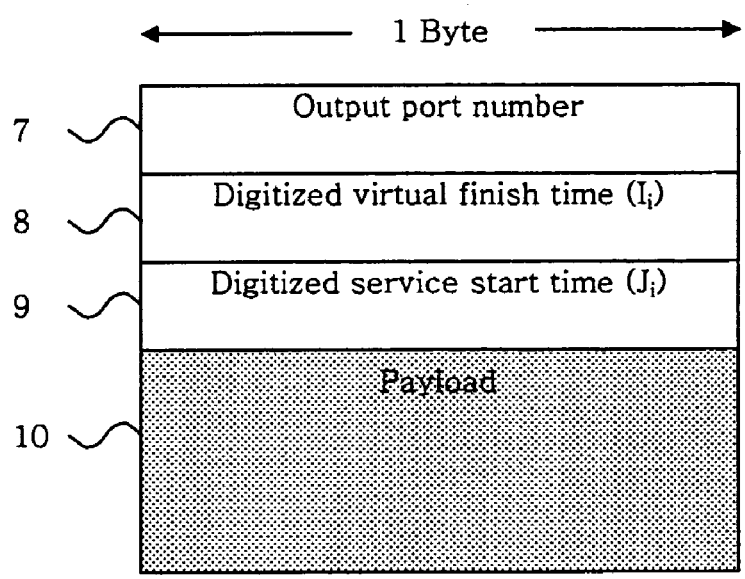
FIG. 2 is a temporary packet format within the QoS capable router illustrated in FIG. 1.

FIG. 2 shows a temporary packet format used in the router apparatus. When a packet arrives through the line interface modules 1, 2, or 3, temporary packet header is added to the arriving packet. It is the processor or processing element in the line interface module 1, 2, or 3 that determines the output port number 7 of the temporary header. The processor in the line interface module looks up the FIB (forwarding information base) to find the destination address of the arriving packet and determines the output port number. The determined output port number is recorded in the output port number field 7 of the temporary packet header. Conventional routers do not require further processing, and the packets with the output port number are sent to the switching module 4.

In the switching module 4, there is a switching and Queuing processor 5 which sends the arriving packets from the line interface modules 1, 2, and 3 to the output queue 6 according to the output port number field 7. Then, the packets are sent to the destination line interface module 1 connected to the output queue 6, and transmitted to the communication link connected to the destination line interface module 1. This type of router architecture shown in FIG. 1 using a temporary packet format shown in FIG. 2 is important to the invention. A QoS (Quality of Service) router according to this invention requires virtual finish time field 8 and optionally service start time field 9. Page 6, line 15 to page 7, line 3.

The QoS router according to this invention has additional functions to restrict the latency of the real-time traffic packets. Using the additional fields 8 and 9, a sort of fair queuing algorithm similar to VirtualClock can be efficiently implemented. The packets from the line interface modules can be segmented into fixed size cells and reassembled in the line interface modules. There are some routers that the segmentation and reassembly operations are performed in the switching module. Both types of routers can use the distributed processing idea of this invention.

This algorithm calculates the virtual finish time of each real-time traffic packet. For the calculation of virtual finish time, the packet arrival time ($A_i$), the reserved rate (R), the packet length ($L_i$), and the virtual finish time of the previous packet ($F_{i-1}$) are required. The virtual finish time of the first packet of each connection is obtained by adding the first packet arrival time to the packet length divided by the reserved rate; $F_1 = A_1 + L_1/R$. Afterwards, the virtual finish time is obtained by adding the larger between the packet arrival time and the virtual finish time of the previous packet to the packet length divided by the reserved rate; $F_i = \max(A_i, F_{i-1}) + L_i/R$. The packets stamped with the virtual finish time are sorted in the increasing order and transmitted in that order. By doing this, the latency of each packet is restricted and the QoS of the traffic is achieved.

This invention makes this algorithm executed by a plurality of processors using the idea of distributed processing. The entire algorithm is broken into smaller pieces and executed by many processors. Thus, we can increase the processing speed and reduce the cost. This embodiment of this invention uses 1 ms of time resolution for the calculation of virtual finish time. For this, the virtual finish time is divided by 0.001 and rounded by ceil function to give digitized virtual finish time; $I_i = \lceil 1000 F_i \rceil \bmod I_{max}$. This digitization brings about error of 1 ms at maximum, but makes the sorting efficient and reduces the size of the digitized virtual finish time field 8. Though this embodiment of this invention selects 1 ms for the digitization resolution, 5 ms or 10 ms of the resolution is also suitable according to applications.

For distributed processing, we can separate calculation of the digitized virtual finish time 8 of packets and sorting the packets according to the digitized virtual finish time 8. Calculation of the virtual finish time can be performed in the line interface modules 1, 2, and 3 and sorting the packets can be performed in the switching module 4 by different processing elements. This lowers work load of the overburdened switching and queuing processor 5 of the switching module and increases the performance of the entire system. Because pre-existing traffic control algorithms did not consider the distributed processing technique, all the work of the traffic control algorithm should have been performed by the switching and queuing processor switching and queuing processor 5 of the switching module 4. However, the traffic control algorithm of this invention makes a plurality of processors or processing elements in different modules cooperate in performing the packet scheduling algorithm in the large scale router. This distributed processing makes the work load of the packet scheduling algorithm evenly distributed to the processors. This lowers the work load of the switching and queuing processor switching and queuing processor 5 of the switching module and makes high speed processing possible.

Figure 3:
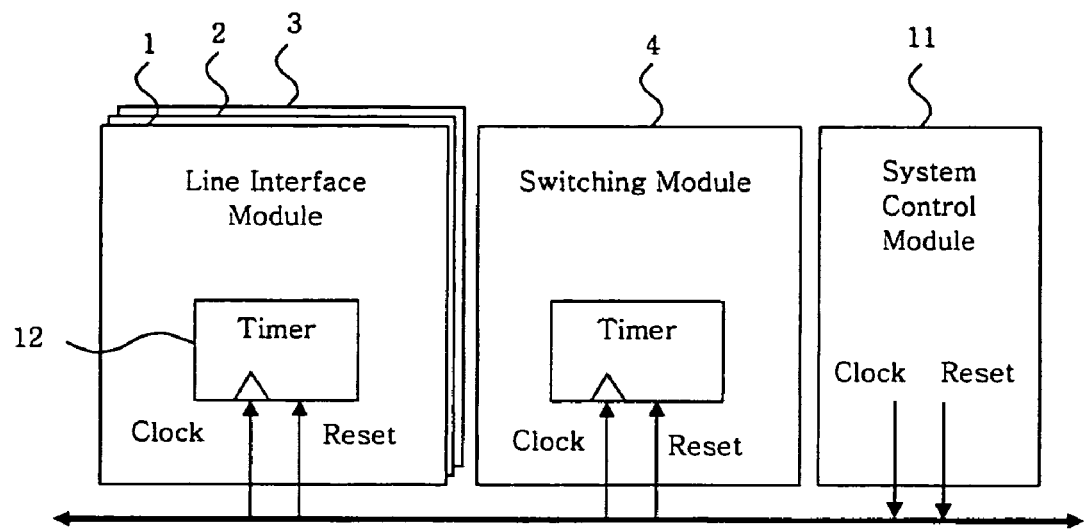
FIG. 3 is a view for clock and reset signal connection apparatus for clock synchronization.

However, the benefit of the distributed processing is not achieved free of charge. The time of all the processing elements of the router should be synchronized. FIG. 3 shows an apparatus of the clock synchronizer of QoS router. The time synchronization is achieved by providing the clock signal and the reset signal generated at the system control module 11 to the line interface modules 1, 2, and 3 and the switching module 4 through the common line. The clock signal 13 is connected to the timer 12 at each module and increases the time of the timer 12 at each clock tick. The processor at each module uses the time of the timer 12 to calculate the virtual finish time of each packet. The reset signal 14 is periodically generated to reset the time of the timer 12 at each module and synchronizes the time at each module. The clock synchronizer of this invention consists of the timer 12 at each module, clock and reset signal generator, and connection lines to each module.

Figure 4:
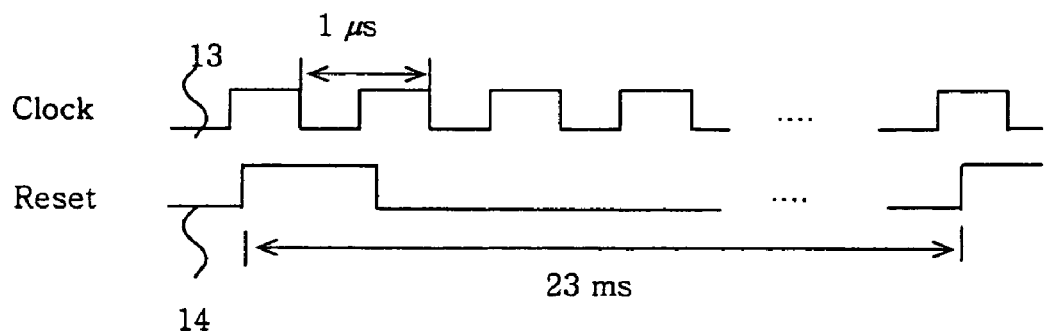
FIG. 4 is a timing diagram of clock and reset signals.

FIG. 4 shows how the clock and reset signals change. The clock signal 13 is a pulse signal changing at every 1 s. This signal is easily generated by a crystal oscillator and the timing is very accurate. This embodiment of this invention proposes the period of the clock signal 13 be 1 s, because the finer accuracy does not have meaning in the real-time traffic QoS guarantee.

The reset signal is 1 every 23 ms for the clock signal period (1 s). Otherwise it is zero. The period of the reset signal is related to the maximum packetization period of the real-time traffic. For example, the maximum packetization period is 10 ms. This means that the traffic transmits a packet every 10 ms. The maximum size of packet is limited to 10 ms in virtual finish time. At the line interface module, rate control is performed to restrict the traffic injected to the switching module. The maximum traffic injected to the switching module is 20 ms. The time of each module is slightly different, but the difference is very small (for example, a few microseconds). We need safety margin before the least virtual finish time and after the largest virtual finish time. The resolution of time for rate control is 1 ms. This causes additional safety margin of 1 ms. Therefore, we have 23 ms of period for the reset signal. The digitized virtual finish time is obtained by modulus operation with $I_{max}$. The value of $I_{max}$ is 23 obtained by 23 ms/1 ms.

Because the period of the clock signal is 1 s, 23000 clock signals should be counted. Thus, the time of the timer 12 change from 0 to 22999. The number of 22999 is 101 1001 1101 0111 in binary. Thus, 15 bits of register is required in the line interface modules 1, 2, and 3 and switching module 4.

Figure 5:
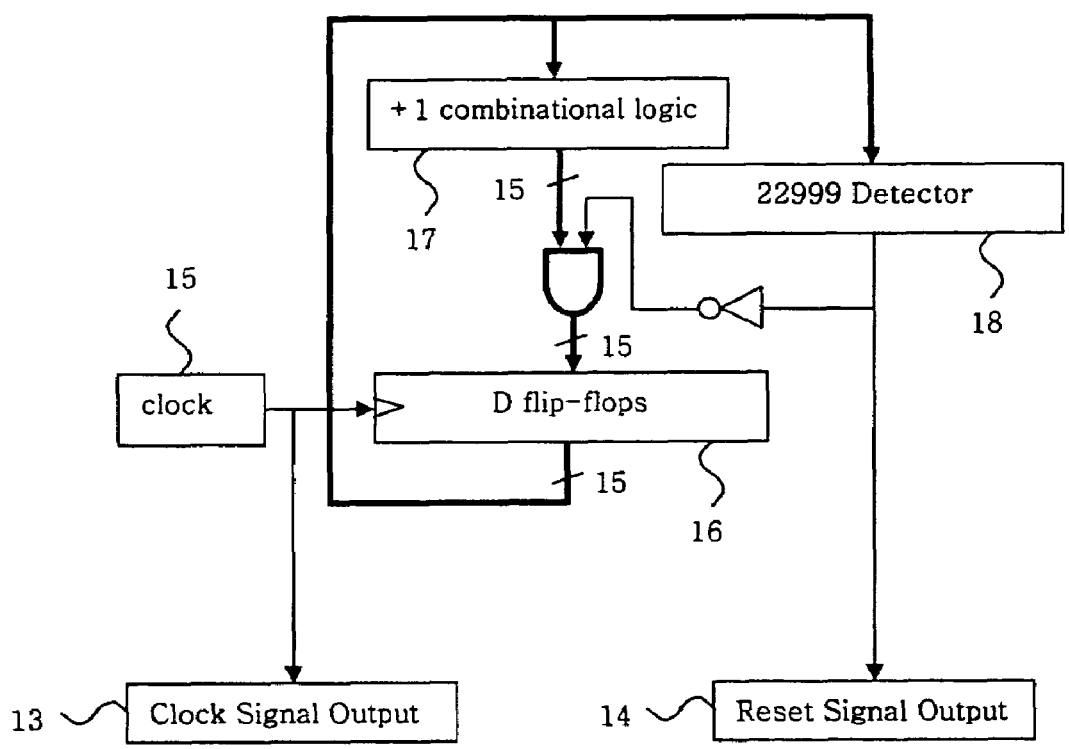
FIG. 5 is a block diagram of clock and reset signal generator.

FIG. 5 shows a digital logic circuit for generating the reset signal. This digital logic circuit is in the system control module and providing the clock signal and the reset signal to all the line interface modules and the switching module.

The content of the time register 16 which is denoted as D flip-flops in FIG. 5 can be directly provided to the other modules instead of the clock and reset signals. Because this implementation requires more connection, it is not economical. However, it is another possible implementation.

The packet format shown in FIG. 2 can selectively have the digitized service start time 9 for rate control. The service start time of the first packet of each connection ($S_1$) is the packet arrival time ($A_1$); $S_1 = A_1$. Afterwards the is the largest value between the arrival time ($A_i$) and the virtual finish time of the previous packet ($S_{i-1}$); $S_i = \max(A_i, S_{i-1})$. The digitized service start time 9 is also digitized by the resolution of 1 ms. The service start time is divided by 1 ms and digitized by floor function; $J_i = \lfloor 1000 S_i \rfloor$. Packets arriving at the line interface module is rate controlled first by the digitized service start time, and then sent to the switching module 4. At the switching module, the packets are scheduled according to the digitized virtual finish time 8. The sorted queue 6 is built for each output port. The sorted queue can be built in the output line interface module.

For connection establishment, related variables should be maintained using signaling protocol such as RSVP. This invention does not require such work in the switching module 4. This work is carried out in the line interface modules. Thus, the switching module 4 becomes much simpler and the work load of the switching and queuing processor 5 gets less. This makes the implementation of the large scale QoS router possible.

Routers using CIOQ (Combined Input Output Queuing) switch with speed-up of two were proved to implement WFQ as published in IEEE Journal on Selected Areas in Communications, June 1999, by Shang-Tse Chuang, Ashish Goel, Nick McKeown, and Balaji Prabhakar. The tilte of the paper is "Matching Output Queuing with a Combined Input/Output-Queued Switch," pp. 1030-1039.

Thus, these routers can guarantee QoS of real-time traffic. These routers have queues in the input line interface modules and the output line interface modules, but not in the switching module. Therefore, we can implement simple and fast switching modules and these routers have good scalability. Our invention can be used for this type of routers. Because the common clock is delivered to all the modules, the switching module can schedule the least virtual finish time first using the common clock. This makes it possible to implement very large QoS routers. Therefore, the CIOQ switch can be a good embodiment of this invention. In this embodiment, the output queue 6 is not placed in the switching module 4, but in the output line interface module 1.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A router including processors or processing elements in line interface modules and a switching module, wherein the processor or processing element in each line interface module looks up a FIB (Forward Information Base) to determine a output port number for each arriving packet and sends the packet to the switching module after recording the output port number on a temporary packet header and a switching and queuing processor in the switching module sends the packets arriving from the line interface modules to an output queue connected to the destination line interface module according to the output port number field on the temporary packet header, additionally including a clock synchronizer, wherein the clock synchronizer makes the time of each module almost identical by providing common clock and reset signals to the line interface and switching modules; wherein the clock synchronizer relates the period of the reset signal to a maximum packetization period of the real-time traffic.

2. A router including processors or processing elements in line interface modules and a switching module, wherein the processor or processing element in each line interface module looks up a FIB (Forward Information Base) to determine a output port number for each arriving racket and sends the racket to the switching module after recording the output port number on a temporary racket header and a switching and queuing processor in the switching module sends the rackets arriving from the line interface modules to an output queue connected to the destination line interface module according to the output port number field on the temporary racket header, further comprising a VLSI (Very Large Scale Integration) chip including plural processing elements, connected to the switching module including the switching and queuing processor, wherein the processing element looks up the FIB (Forward Information Base) to determine the output port number for each arriving packet and sends the packet to the switching module after recording the output port number on the temporary packet header and the switching and queuing processor in the switching module sends the packets arriving from the line interface modules to the output queue connected to the destination line interface module according to the output port number field on the temporary packet header.

3. A router including processors or processing elements in line interface modules and a switching module, wherein the processor or processing element in each line interface module looks up a FIB (Forward Information Base) to determine a output port number for each arriving racket and sends the racket to the switching module after recording the output port number on a temporary racket header and a clock synchronizer, wherein the router performs real-time traffic control based on common synchronized time provided by the clock synchronizer, using virtual finish time calculation algorithm for packet fair queuing using time from a timer of a clock synchronizer by adding the larger between the packet arrival time obtained from the clock synchronizer ($A_i$) and the virtual finish time of the previous packet ($F_{i-1}$) to the packet length ($L_i$) divided by the reserved rate ($R$); $F_i = \max(A_i, F_{i-1}) + L_i/R$.

4. A VLSI (Very Large Scale Integration) chip including plural processing elements, connected to a switching module which includes a switching and queuing processor, wherein the processing element looks up the FIB (Forward Information Base) to determine a output port number for each arriving packet and sends a packet to the switching module after recording the output port number on a temporary packet header and a switching and queuing processor in the switching module sends the packets arriving from the line interface modules to the output queue connected to the destination line interface module according to the output port number field on the temporary packet header.

* * * * *